O. SHEPPARD, Jr.
COTTON SEED MEAL COOKER.
APPLICATION FILED JULY 27, 1921.
1,433,746.
Patented Oct. 31, 1922.
4 SHEETS—SHEET 1.
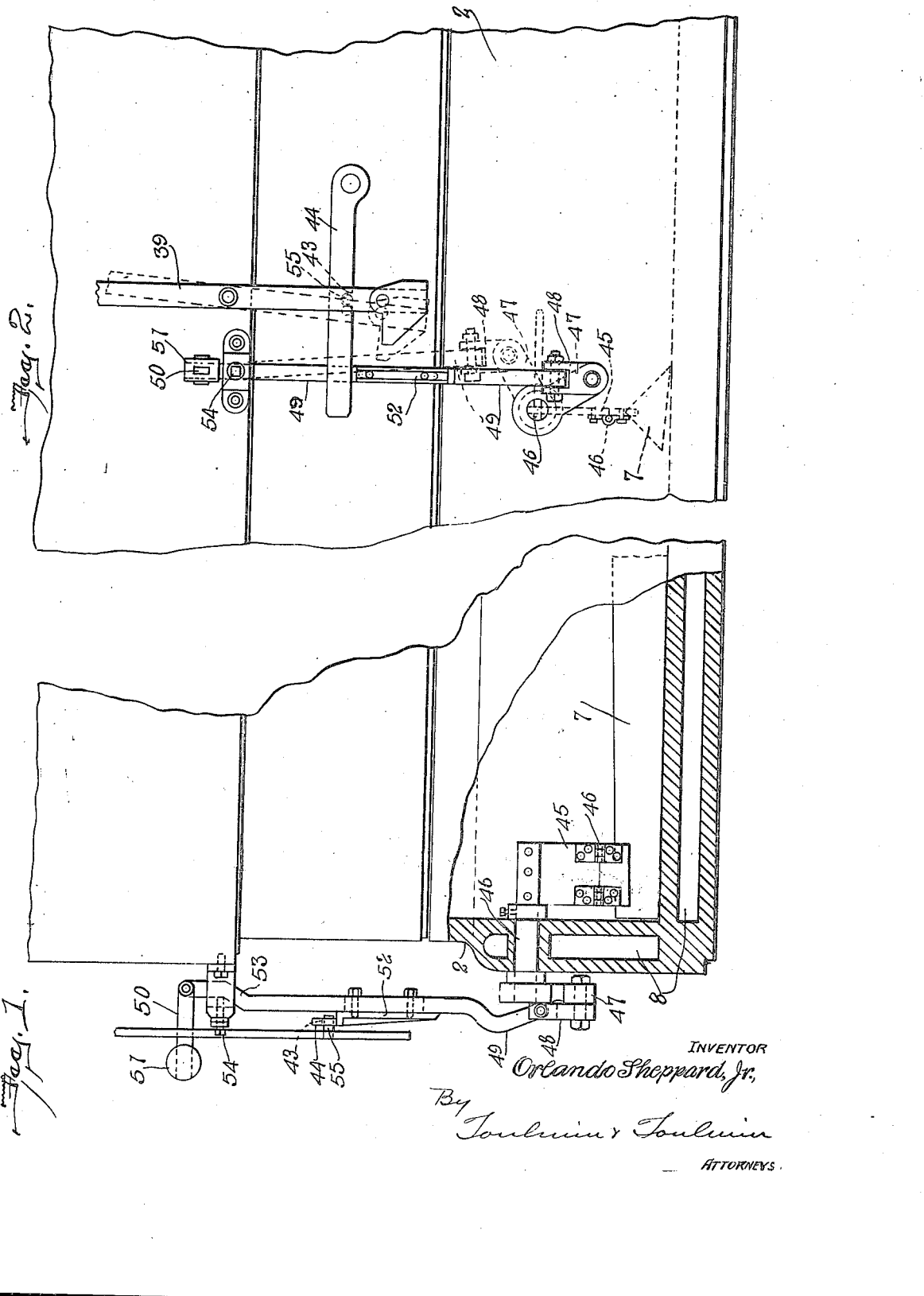
INVENTOR
Orlando Sheppard, Jr.,
By Toulmin & Toulmin
ATTORNEYS.

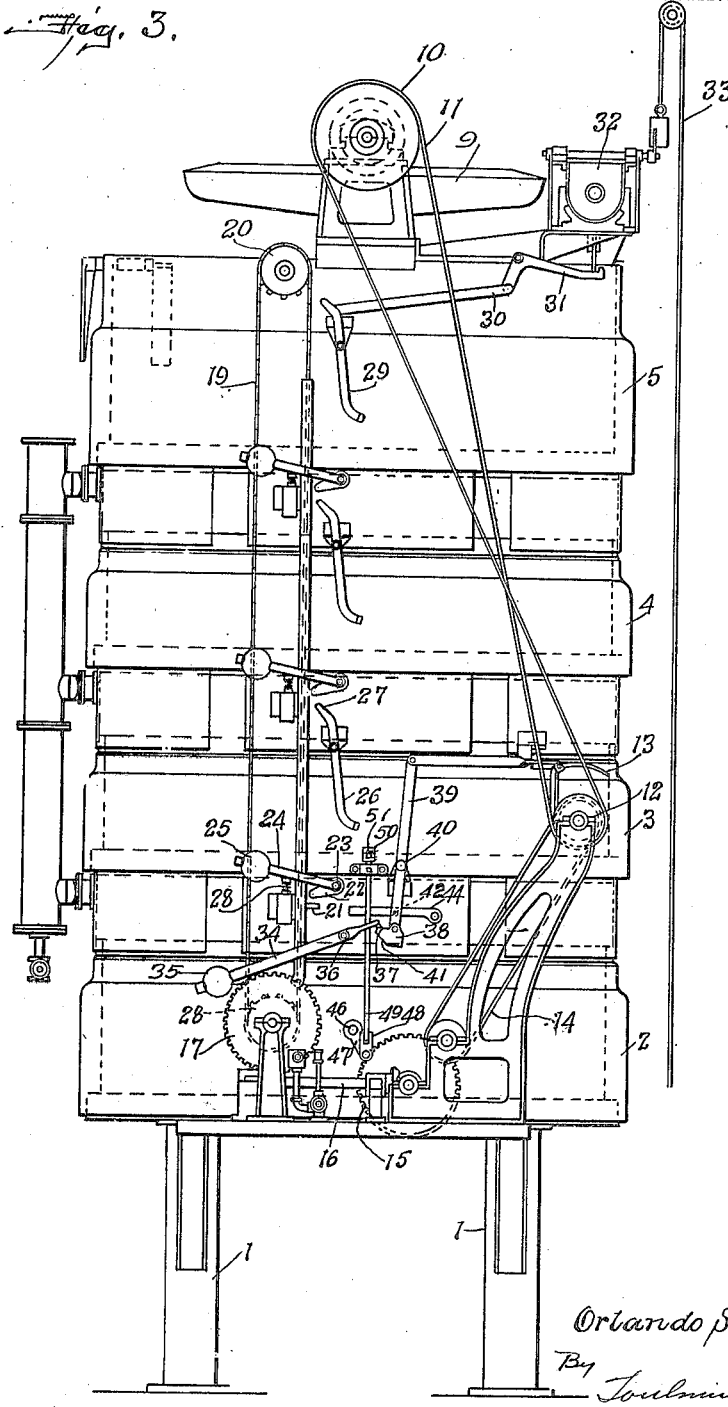

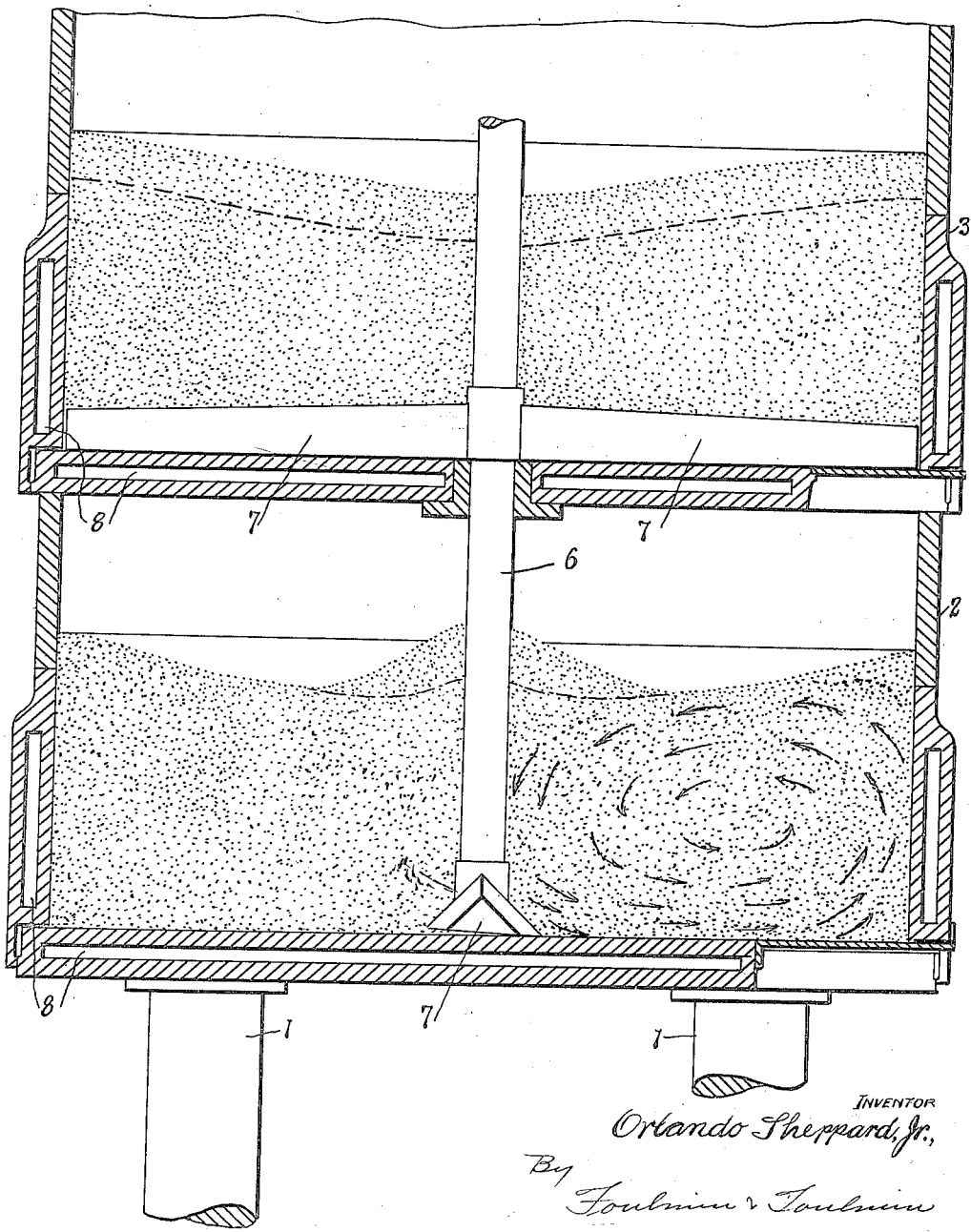

O. SHEPPARD, Jr.
COTTON SEED MEAL COOKER.
APPLICATION FILED JULY 27, 1921.

1,433,746.

Patented Oct. 31, 1922.
4 SHEETS—SHEET 4.

INVENTOR.
Orlando Sheppard, Jr.,
BY
Toulmin & Toulmin
ATTORNEYS.

Patented Oct. 31, 1922.

1,433,746

UNITED STATES PATENT OFFICE.

ORLANDO SHEPPARD, JR., OF ATLANTA, GEORGIA, ASSIGNOR TO BUCKEYE IRON & BRASS WORKS, OF DAYTON, OHIO, A CORPORATION OF OHIO.

COTTONSEED-MEAL COOKER.

Application filed July 27, 1921. Serial No. 487,872.

*To all whom it may concern:*

Be it known that I, ORLANDO SHEPPARD, Jr., a citizen of the United States, residing at Atlanta, in the county of Fulton and State of Georgia, have invented certain new and useful Improvements in Cottonseed-Meal Cookers, of which the following is a specification, reference being had therein to the accompanying drawing.

My invention relates to apparatus for cooking oleaginous materials and in particular to cookers for cotton seed meal.

The object of my invention is to provide a mechanism to maintain the lowermost kettle suitably filled with meal or oleaginous material.

It is an additional object of my invention to provide mechanism for the successive discharging of the material from one kettle to another to accomplish this object. It is a further object of my invention to provide mechanism which will permit of the reversal of direction of the stirrer without injuring the remainder of the machinery. It is another object of my invention to provide a stirrer in combination with such mechanism which will give to the meal in the kettle a rolling motion like the waves on a sea so that every portion of the meal as the stirrer moves will be agitated. It is a further object of my invention to provide a stirrer in combination with this mechanism which will move the meal in a circular path within the main body of the meal so that all portions of the meal will come in contact with the steam heated walls of the kettle. It is my object to thus secure a thorough treatment of all the meal.

It is a further object of my invention to provide locking and unlocking means to be actuated by the stirrer and not to be actuated by the meal itself as any particular weight or strain imparted through the float to the meal does not accomplish its object of actuating the mechanism successfully because the heavy float, when under any resistance or weight, tends to bury itself in the meal.

Referring to the drawings:

Figure 1 is a side elevation of the operating mechanism with a portion of the kettle cut away;

Fig. 2 is a front elevation of the mechanism with the stirrer shown in dotted lines;

Fig. 3 is a side elevation of the complete operating mechanism;

Fig. 4 is a side elevation of a pair of the kettles showing the movements of the meal due to the action of the stirrer. The side walls of the kettles are removed.

Figure 5:
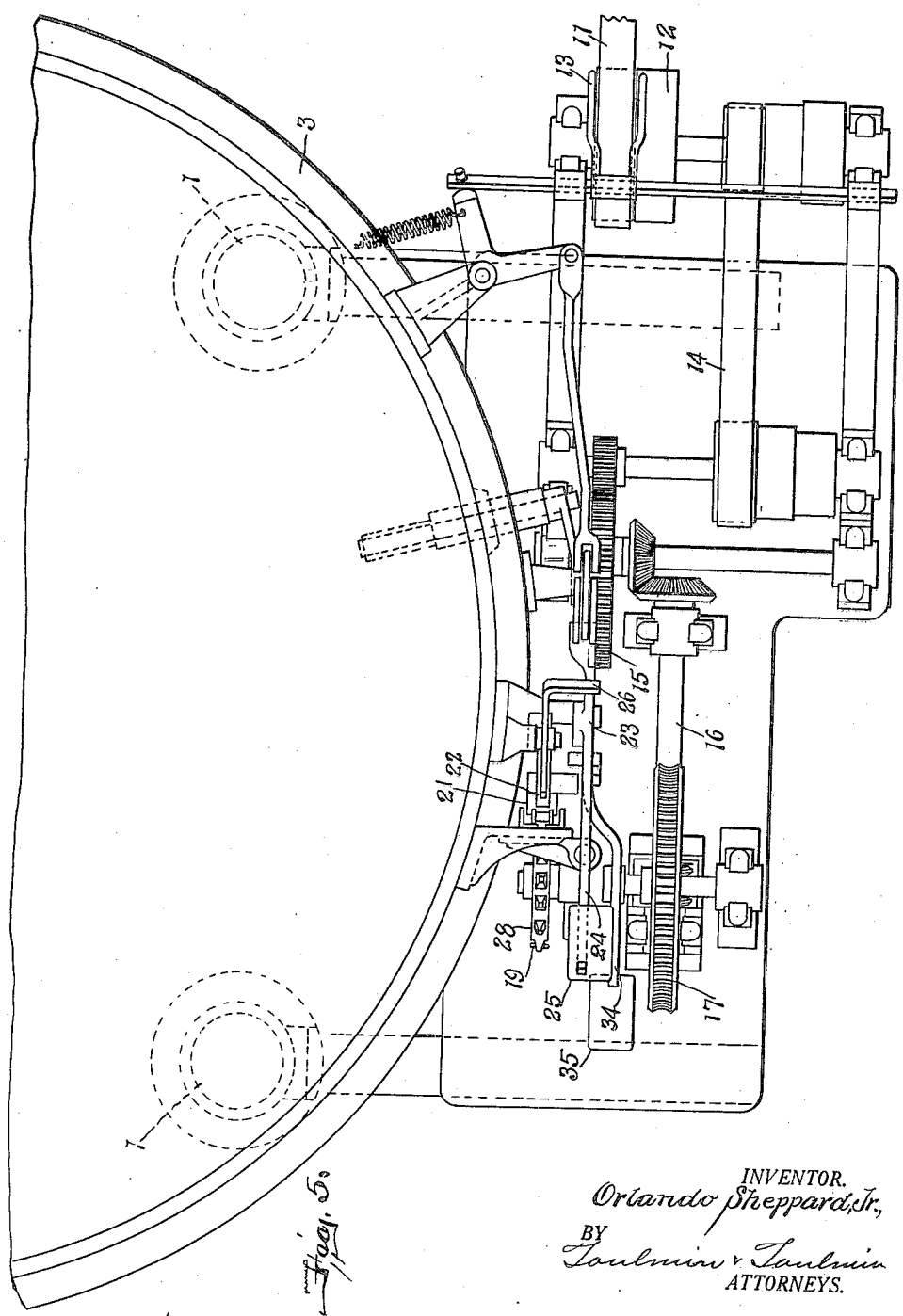
Fig. 5 is a plan view of the mechanism for maintaining the belt on the tight pulley.

Referring in detail to the drawings, 1—1 are the pedals upon which a stack of cookers 2, 3, 4 and 5 are mounted. Centrally located in these cookers is a main operating shaft 6. Upon this shaft 6 is affixed a V-shaped stirrer 7, there being a stirrer to each kettle.

The kettles are steam jacketed with steam passage ways 8 in the sides thereof and in the bottoms thereof.

The shaft 6 is continuously driven from some suitable source of power through the gear 9. The gear 9 drives the pulley 10 from which passes the main actuating belt 11 to a tight and loose pulley generally designated 12. 13 is a belt shifter for shifting the belt from the tight to the loose pulley. 14 is a pulley that drives through the gear 15 to the shaft 16 and the gear 17, the sprocket 28. Around the sprocket 18 passes the main actuating chain 19 that is supported at its upper end by the sprocket 20. The chain 19 carries an actuating lug 21 that successively trips the gates or doors in the bottom of each cooker to permit of the dumping of the material therein from one kettle into the kettle below. 21 comes in contact with the arm 22 that is fixed on the same shaft 23 to the arm 24 which carries the weight 25. As 21 passes upwardly it lifts the arm 24 and 22 opening the gate. The arm 24 passes over dead center and rests against the supporting lever 26. This lever is actuated by 21 when it comes in contact with the end 27 thereof and thus throws the arm 24 back into its closed position. This happens successively with each gate operating mechanism. 28 is a shock absorber to absorb the shock of 24 being brought back to its closed position. Likewise the lever 29 is actuated to move the levers 30 and 31 to open the door in the bottom of the conveyor 32 to permit the material to drop into the topmost kettle 5. This door is closed by hand through the rope 33.

When the lug 21 comes to a point just above the wheel 17 it comes in contact with the operating lever 34 that has the weight 35 on the end thereof and is pivoted at 36. The end 37 of this lever 34 comes in contact with the swinging weighted end 38 of the actuating lever 39 pivoted at 40. As 38 is adapted to swing freely in the right hand direction, 37 passes by it, but when 37 returns upwardly it comes in contact with the cam surface 41 of 38 and forces the lever 39 to one side thus bringing the pin 42 in position to register with the notch 43 of the latch 44 and to lock 39 in that position. This results in locking the belt 11 on the loose pulley at 12 through the medium of the belt shifter 13.

When the meal is sufficiently extracted from the lowermost kettle 2, the stirrer 7 will come in contact with the depending float 45 thus rotating the shaft 46. 46 carries on it the lever 47. To 47 is pivoted the link 48 that is in turn pivoted to the lever 49. 49 carries at its upper end the weighted arm 50 with the weight 51 thereon. Upon 49 is a lug or shoulder 52 adapted to engage with the latch arm 44 to elevate it.

The float 45 is hinged at 46 in order to permit of the stirrer being reversed in direction without injuring the float.

When the lever 49 moves upwardly with its lug 52, it is also moved laterally by reason of the fact that it has an angular portion 53 that comes in contact with a set screw 54 that shifts laterally so that as the lever 49 is elevated it will elevate the latch 44 for a distance and then slip by the latch allowing it to drop back upon the pin 55 carried by the lever 39.

If the lowermost kettle is filled and the parts stand in the position shown in dotted lines in Figure 2, when the lug comes around on its upward movement, it will move the lever 39 back to the position shown in full lines so that the latch will drop over the pin and thus lock the mechanism in its inoperative position. When the meal is removed from the kettle this will permit the float 45 to drop downwardly until the stirrer 7 comes in contact with it. At this time the parts will be as shown in full lines in Figure 2, with 52 under 44. As 7 moves 45, and thereby elevates 48, it will elevate 52 unlocking 39 and permitting the belt to move on to the tight pulley due to the action of the spring which normally tends to keep the belt on the tight pulley and the mechanism will be started in its cycle of operation again.

It will, therefore, be seen that the mechanism will continuously operate without any stoppage if the meal is withdrawn from the lowest kettle before the chain can make a complete revolution, but if this does not occur, then the chain will stop if the float is standing at a point which may be predetermined by the adjustment of the mechanism. It will, therefore, also stop at any predetermined depth of the meal in the lowermost kettle.

Method of operation.

It will be noted in Figure 4 that as the stirrer moves around a wave on the surface of the material will follow it as it elevates the material due to its peculiar action. Furthermore, the meal or material will travel in the direction of the arrows as indicated in this drawing so that a rolling motion is imparted to the meal thus presenting in succession every portion of the material to the steam heated walls of the kettles. This results in a thoroughly cooked and thoroughly treated quantity of material.

When the meal is introduced at the top of the kettle in suitable quantities it is permitted by the movement of the chain to be successively dumped in successive charges from kettle to kettle so that all of the kettles will be filled with a predetermined quantity of the meal.

By this combination of the movement of the meal by the stirrer and the actuation of the mechanism by the stirrer, I am enabled to secure a co-ordination of process in the several steps and a co-ordination of the mechanism which produces a unique result. The meal is maintained a predetermined time in each kettle and a predetermined quantity of the meal is maintained in each of the kettles, thus resulting in uniformity of cooking. As the stirrer moves with a uniform speed, I secure a uniform movement and treatment of the meal in each kettle due to the rolling action imparted thereto by the stirrer. This same stirrer mechanism determines the rate of movement of the quantities of meal from one kettle to another due to its action upon the locking and unlocking mechanism. As the stirrer mechanism is timed, or connected, with, mechanically, the gate actuating mechanism for discharging the material from one kettle to another the entire mechanism is synchronized to operate as a unit and I am, therefore, enabled to produce what I believe to be a unique result.

Thus it is necessary in normal operation of the cooker to remove the meal from the kettle entirely before the chain comes around for its next succeeding revolution.

Having thus fully described my invention, what I claim as new and desire to secure by Letters Patent, is:—

1. In a cooker, means to fill a kettle with material, a kettle, a stirrer in said kettle, a locking means to lock the kettle filling means in inoperative position means adapted to be actuated by said stirrer to unlock a locking means, whereby when said locking means is unlocked the kettle may be filled.

2. In combination in a cooker, a plurality of kettles, a stirrer in the lowermost kettle, unlocking means adapted to be actuated by said stirrer, locking means to maintain the loading mechanism for said kettle in inoperative position, whereby when the parts are actuated the loading means will be unlocked and permitted to operate to load the respective kettles.

3. In combination, a plurality of kettles, a stirrer in the lowermost kettle, a float in the lowermost kettle adapted to be actuated by said stirrer, discharge gates means to operate discharge gates in each of said kettles, means to lock said operating mechanism in inoperative position, unlocking means connected to said float adapted to unlock the locking means and permit the discharging means to operate.

4. In combination, a plurality of kettles, a stirrer in the lowermost kettle, a float in the lowermost kettle adapted to be actuated by said stirrer, discharge gates means to operate discharge gates in each of said kettles, means to lock said operating mechanism in inoperative position, unlocking means connected to said float adapted to unlock the locking means and permit the discharging means to operate, and means to permit of the reversal of direction of the stirrer without injuring the float.

5. In combination in a cooker, a plurality of kettles, a gate in the bottom of each kettle, mechanism for operating said gates in succession, a driving mechanism to operate said operating mechanism; means to lock said driving mechanism in inoperatve position, unlocking means for said locking means, a stirrer in the lowermost kettle a float adapted to be held in its inoperative position by meal in the lowermost kettle and to be actuated in its operative position by a stirrer in the lowermost kettle, whereby when the meal is evacuated from the lowermost kettle below the top of the stirrer the float will be actuated by the stirrer and the charging mechanism started in operation to recharge the several kettles.

6. In combination in a cooker, a plurality of kettles, a gate in the bottom of each kettle, mechanism for operating said gates in succession, a driving mechanism to operate said operating mechanism; means to lock said driving mechanism in inoperative position, unlocking means for said locking means, a stirrer in the lowermost kettle a float adapted to be held in its inoperative position by meal in the lowermost kettle and to be actuated in its operative position by a stirrer in the lowermost kettle, and means to permit of the stirrer being moved in the reverse direction without injuring the operating means for the unlocking means, whereby when the meal is evacuated from the lowermost kettle below the top of the stirrer the float will be actuated by the stirrer and the charging mechanism started in operation to recharge the several kettles.

7. In a cooker, a plurality of kettles, a plurality of gates to permit of the discharge of material from one kettle to another, actuating mechanism to operate said gates in succession, driving mechanism to move said actuating mechanism, a lock to lock said actuating mechanism in inoperative position, means to normally maintain said lock in locked position, consisting of a lever having a locking pin thereon, and a weighted head, an actuating lever with a shoulder thereon adapted to engage with a latch, a latch with a notch therein to engage the pin on the aforementioned lever to lock the parts in inoperative position, a weight on the upper end of the unlocking lever to maintain it in its inoperative position, a float in the lowermost kettle mounted on a transverse shaft, a crank arm on said shaft having its free end attached to said unlocking lever pivotally, a stirrer adapted to engage said float, whereby when the meal in the lowermost kettle is evacuated the stirrer will actuate the float, unlock the gate operating mechanism and thereby recharge the several kettles.

8. In a method of cooking oleaginous material, filling a series of kettles communicating with one another with a quantity of said material, moving a stirrer in each of said kettles, thereby agitating the material with a rolling motion, controlling the discharge of the material from one kettle to another by the movement of the stirrer, retaining the meal in the kettles a predetermined time, and discharging the material from one kettle to another when the meal in the lowermost kettle is withdrawn and the stirrer is permitted to actuate the discharging mechanism.

9. In a method of cooling an oleaginous material, placing the material in a kettle, stirring the material with a stirrer to cause it to billow over the stirrer and to travel with a circular motion so as to present all the parts of the meal to the steam heated surfaces of the kettle, moving the material so treated to another kettle, repeating the stirring operation on the material, lifting a latch mechanism by a float riding against the stirrer, starting the discharge mechanism and withdrawing the material from the second kettle, stopping the discharge mechanism when the lowest kettle is filled to a predetermined level, and starting the mechanism when the meal is withdrawn from the lowest kettle, thereby locking and unlocking the mechanism for discharging material from one kettle to another.

In testimony whereof, I affix my signature.

ORLANDO SHEPPARD, Jr.